(12) United States Patent
Ackermann

(10) Patent No.: US 7,389,861 B2
(45) Date of Patent: Jun. 24, 2008

(54) HYDRODYNAMIC CLUTCH DEVICE

(75) Inventor: Jürgen Ackermann, Schweinfurt (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 267 days.

(21) Appl. No.: 11/304,157

(22) Filed: Dec. 15, 2005

(65) Prior Publication Data

US 2006/0124420 A1 Jun. 15, 2006

(30) Foreign Application Priority Data

Dec. 15, 2004 (DE) .................. 10 2004 060 256

(51) Int. Cl.
*F16H 45/02* (2006.01)
(52) U.S. Cl. .................. 192/3.3; 192/70.28; 192/113.36
(58) Field of Classification Search .................. None
See application file for complete search history.

(56) References Cited

U.S. PATENT DOCUMENTS

| 4,924,987 | A | * | 5/1990 | Kennedy .................. 192/58.8 |
| 5,575,363 | A |  | 11/1996 | Dehrmann et al. |
| 5,732,804 | A |  | 3/1998 | Wienholt |
| 5,762,172 | A | * | 6/1998 | Tsukamoto et al. ........ 192/3.29 |
| 2001/0042666 | A1 | * | 11/2001 | Kundermann et al. ...... 192/3.29 |
| 2002/0011392 | A1 | * | 1/2002 | Yoshimoto et al. .......... 192/212 |

FOREIGN PATENT DOCUMENTS

| DE | 35 43 013 | 6/1987 |
| DE | 198 12 865 | 9/1999 |
| DE | 199 41 366 | 3/2001 |
| DE | 101 04 346 | 8/2002 |
| DE | 101 09 520 | 9/2002 |
| DE | 102 33 335 | 2/2004 |
| EP | 0 770 797 | 5/1997 |
| FR | 2 556 807 | 6/1985 |

OTHER PUBLICATIONS

Search Report dated Dec. 12, 2004 for German Application No. 10 2004 060 256.5.
Search Report dated Mar. 22, 2006 for the corresponding European Application No. 05 026 295.5-2421.

* cited by examiner

*Primary Examiner*—Richard M. Lorence
*Assistant Examiner*—Edwin A Young
(74) *Attorney, Agent, or Firm*—Cohen Pontani Lieberman & Pavane LLP

(57) ABSTRACT

A hydrodynamic clutch device includes a clutch housing connected to a drive, a pump wheel connected to the clutch housing, and a turbine wheel connected to a takeoff, the turbine wheel and the pump wheel forming a hydrodynamic circuit. A bridging clutch which is essentially surrounded by the hydrodynamic circuit includes a piston and at least one friction surface which can be acted on by the piston to connect the drive to the takeoff independently of the hydrodynamic circuit, the piston having one surface facing the hydrodynamic circuit and an opposite surface facing a pressure space. A pressure circuit includes a first pressure medium line to supply the hydrodynamic circuit with clutch fluid and a second pressure medium line to supply the pressure space with clutch fluid. A seal at least reduces the exchange of fluid between the hydrodynamic circuit and the pressure space, and a throttle allows a defined exchange of fluid between the hydrodynamic circuit and the pressure space.

17 Claims, 2 Drawing Sheets

HYDRODYNAMIC CLUTCH DEVICE

BACKGROUND OF THE INVENTION

1. Field of the Invention

The invention pertains to a hydrodynamic clutch device of the type having a clutch housing connected to a drive; a pump wheel connected to the clutch housing, the pump wheel having a hub; a turbine wheel connected to a takeoff, the turbine wheel and the pump wheel forming a hydrodynamic circuit; a bridging clutch having a piston and a friction surface which can be acted on by the piston to connect the drive to the takeoff independently of the hydrodynamic circuit, the piston having one surface facing the friction surface and an opposite surface; a pressure space for exerting fluid pressure on the piston; and a pressure circuit including a first pressure medium line to supply the hydrodynamic circuit with clutch fluid and a second pressure medium line to supply the pressure space with clutch fluid.

2. Description of the Related Art

U.S. Pat. No. 5,575,363 describes a hydrodynamic clutch device designed as a hydrodynamic torque converter, the clutch housing of which is attached for rotation in common in the conventional manner to a drive, such as an internal combustion engine. The clutch device comprises a pump wheel, which works together with a turbine wheel and a stator to form a hydrodynamic circuit. Whereas the turbine wheel is connected nonrotatably to a takeoff, such as a gearbox input shaft, the stator is mounted by way of a freewheel on a support shaft, which is provided radially between a pump wheel hub and the gearbox input shaft. In addition, the hydrodynamic clutch device also has a bridging clutch with a piston, which is connected nonrotatably but with freedom of axial movement to the clutch housing.

The hydrodynamic clutch device is designed as a two-line system, as a result of which the following pressure and flow relationships are created:

A first pressure medium line for supplying the hydrodynamic circuit is formed by thrust washers, one of which is located on each side of the freewheel of the stator, and each of which is provided with flow channels for clutch fluid. This first line is connected to a first flow route, which has flow channels, one of which is located radially between the pump wheel hub and the support shaft, the other radially between the support shaft and the gearbox input shaft. When the pressure in the hydrodynamic circuit is positive, the piston is pushed toward the adjacent housing cover of the clutch housing and is thus carried along rotationally by the clutch housing when the friction surfaces provided there engage. Conversely, this rotation in common stops when pressure medium is supplied through a second pressure medium line to a pressure space assigned to the piston and located axially between the piston and the housing cover. As a result of this supply of fluid, the pressure in this pressure space becomes greater than that in the hydrodynamic circuit, and the piston is thus shifted axially toward the hydrodynamic circuit. The second pressure medium line is connected to a second flow route, which leads through a central bore in the gearbox input shaft. Each of the two flow routes is connected to its own fluid reservoir.

The essential principle of this type of two-line system is that the bridging clutch serves as a separation point between the hydrodynamic circuit and the pressure space. This arrangement also represents the essential disadvantage of the two-line system for the following reason. The friction surface, at least one of which is provided, fulfills two different functions when the bridging clutch is engaged, namely, that of transmitting torque from the clutch housing to the takeoff so that the hydrodynamic circuit is bypassed, and also that of sealing the hydrodynamic circuit off against the pressure space, which is essentially pressureless in this operating state. If the sealing action is inadequate because of overgenerous grooving in the area of the friction surfaces, for example, an undesirably large volume of clutch fluid will be discharged from the hydrodynamic circuit via the bridging clutch into the pressure chamber and thus out of the clutch housing, and this lost volume would have to be replaced from the fluid reservoir. Conversely, if the sealing action in the area of the bridging clutch is too effective because the grooving in the area of the friction surfaces is very limited or because there is no grooving at all, the problem would result that the friction surfaces will become glazed very quickly and thus the friction linings in the area of the friction surfaces will be destroyed, especially when the slippage between the piston and the clutch housing causes the temperature of the minimum of one friction surface to increase. It is therefore necessary to produce a precisely defined flow in the area of the friction surfaces, and for this purpose it is necessary to conduct extensive testing with groovings of different dimensions. But even if the grooving is correctly dimensioned, wear or manufacturing tolerances will make it impossible to maintain the exact, desired volume flow rate of clutch fluid.

To solve this problem, designs are known in which the grooving no longer determines the volume flow rate passing through the bridging clutch in the engaged state. Instead, at least one point of throttled flow performs this function, which, according to U.S. Pat. No. 5,732,804, is provided in the piston of the bridging clutch in the radial area of the minimum of one friction surface. This throttled flow serves to supply a precisely defined volume flow rate of clutch fluid to the grooving assigned to the minimum of one friction surface. Although this eliminates the need to perform complicated tests to determine the dimensions of the grooving, it has been found that bridging clutches with these types of throttled flows can provide only certain areas of the friction surfaces with a flow of fluid and that it is impossible to prevent with sufficient reliability certain other areas from becoming overheated.

SUMMARY OF THE INVENTION

The invention is based on the task of designing a clutch device based on the two-line system in such a way that, with modest technical effort, sufficient and uniform cooling of at least one friction surface of a bridging clutch is guaranteed, while a precisely predetermined, limited volume flow rate between a hydrodynamic circuit and a pressure chamber assigned to the piston of the bridging clutch can be provided at the same time.

According to the invention, the bridging clutch is essentially surrounded by the hydrodynamic circuit, and the pressure space is bounded axially by first and second walls, the first wall being formed by the opposite surface of the piston. A seal at least reduces the exchange of fluid between the hydrodynamic circuit and the pressure space, and a throttle formed in the second wall allows a defined exchange of fluid between the hydrodynamic circuit and the pressure space. It is essential here that the bridging clutch be located in such a way that it is surrounded completely or almost completely by the hydrodynamic circuit. As a result, the bridging clutch does not form a sealing point between zones of different pressures inside the clutch housing. The same pressure, namely, the pressure of the hydrodynamic circuit, is therefore present both on the flow inlet side and on the flow outlet side of the minimum of one friction surface of the bridging clutch. It is thus possible to provide grooves with large cross sections or possibly a plurality of grooves with smaller cross sections to ensure intensive, uniform cooling of the friction surfaces. This results in no disadvantage, because the volume of fluid passing by the minimum of one friction surface along this route cannot leave the hydrodynamic circuit. Instead, the boundary between the hydrodynamic circuit and the pressure space is at a point remote from the bridging clutch, preferably on the side of the piston facing away from the bridging clutch.

The piston preferably forms the first wall of the pressure space, while the second wall is axially offset toward the turbine wheel. One side of the second wall works together with the first wall, i.e., with the piston, to form the axial boundaries of the pressure space, whereas the other side creates a barrier, impermeable to clutch fluid, between the pressure space and the hydrodynamic circuit. Consequently, the hydrodynamic circuit is adjacent to the side of the second wall which faces away from the pressure space.

The pressure space also has a boundary radially on the outside, this being provided by an appropriate seal, which acts between the piston and the second wall of the pressure space. The seal is preferably located in the extreme outward radial area, so that the pressure space can extend directly up to the radially outer area of the piston. This has an advantageous effect on the effective surface area of the piston which can be actuated when there is positive pressure in the pressure space. It is obvious that the seal must be designed to allow the required relative axial movement between the piston and the second wall.

Because of this special design of the hydrodynamic clutch device, there is no connecting point permeable to clutch fluid between the pressure space and the hydrodynamic circuit. As a result, a throttle point can be provided in the best possible position in the clutch housing, i.e., in the most suitable position for a connecting point. The dimensions of this throttle point guarantee a precisely defined exchange of clutch fluid between the pressure space and the hydrodynamic circuit in both directions of flow. Thus, when the bridging clutch is released, the hydrodynamic circuit can be filled through a first pressure medium line, which is preferably connected to a piston space assigned to the hydrodynamic circuit and located axially between the housing cover of the clutch housing and the piston. The hydrodynamic circuit is supplied with fresh clutch fluid through this piston space, whereas heated or spent clutch fluid can leave via the throttle point of the clutch housing and through a second pressure medium line at an exactly defined volume flow rate. To engage the bridging clutch, the clutch fluid must merely be introduced through the second pressure medium line at the desired volume flow rate into the pressure space, where—if the seal is located in the radially outer area as previously mentioned—it can expand all the way to this radial area. When the pressure space is being supplied with clutch fluid, the clutch housing is usually rotating around its axis of rotation. Therefore, the movement of the pressure medium in the pressure space toward the radially outward area is assisted by centrifugal force, and simultaneously the air cushion present in the pressure space is displaced radially inward because of its lower density and can then escape through the throttle point into the hydrodynamic circuit, because the arriving clutch fluid blocks the second pressure medium line. As a result, essentially pure clutch fluid is present in the pressure space, so that the piston can be engaged very quickly when the command is given. The small dimensions of the pressure space axially between the piston and the second wall also have an advantageous effect in this respect.

The second wall is preferably connected to the piston positively or for rotation in common, so that, although this wall allows the piston to accompany its own rotational movement around the axis of rotation of the clutch housing, it also gives the piston the ability to shift axially, which is necessary for the engaging or disengaging movements. To this extent, the second wall also assumes the function of an anti-twist protection device for the piston.

In operating modes of the hydrodynamic clutch device in which large amounts of heat must be carried away from the clutch housing by the clutch fluid present in the hydrodynamic circuit, it can be necessary to replace large amounts of this clutch fluid with fresh clutch fluid. But, as previously explained, the only flow connection between the pressure space and the hydrodynamic circuit is through the throttle point, and the flow rate through this point is predetermined in particular by the desired flow rate in the hydrodynamic circuit. For this reason, other possibilities must be created for conducting, if necessary, large volumes of clutch fluid out of the hydrodynamic circuit; ideally, this would be done precisely when the hydrodynamic circuit is being filled up with fresh clutch fluid via the first pressure medium line, which, in the case of the inventive design of the clutch device, is what occurs when the bridging clutch is disengaged. In this operating state, the pressure in the hydrodynamic circuit is greater than that in the pressure space, so that the positive pressure in the hydrodynamic circuit can open a nonreturn valve located preferably in the second wall, as a result of which at least one additional flow opening is made available, which is otherwise impassable to clutch fluid because of the nonreturn valve. As soon as a sufficient amount of the clutch fluid present in the hydrodynamic circuit has been replaced, the nonreturn valve can be switched back by increasing the pressure in the pressure space by way of the second pressure medium line, as a result of which the minimum of one additional flow opening is closed again. The nonreturn valve is preferably designed as a mushroom-shaped valve with a sealing cover, which can be pressed against the second wall, and with a shaft, which is captured in a receiving opening in the second wall but is held so that it can shift in the axial direction. Both the sealing cover and the shaft are preferably made of heat and pressure resistant plastic.

It is interesting that, in the inventive clutch device, not only the axial position of the piston of the bridging clutch but also the pressure and filling situation in the hydrodynamic circuit are determined by the two pressure medium lines leading to the sides of the piston. The feed line realized in conventional clutch devices in the area of the freewheel of the stator by thrust washers located on ether side of the stator is thus eliminated. Although these types of thrust washers can also be present in the inventive clutch device, they do not have to accommodate the otherwise conventional flow channels required to supply fluid to the hydrodynamic circuit and are thus able to absorb the axial load exerted on the freewheel with lower pressures per unit surface area.

As previously explained, the clutch-engaging operation occurs very quickly because of the compact design of the pressure space and because of the essential absence of an air cushion in that space. There is therefore no need for any axial spring-loading. Because of the compact design of the piston space, furthermore, there is also no need for axial spring-loading between the housing cover and the piston of the bridging clutch to assist with the disengagement of the clutch. Nevertheless, it can be advantageous to provide axial spring-loading to assist the clutch-release operation, especially since the piston can travel a relatively long distance in the axial direction, and the axial spring-loading can thus ensure not only that the piston moves sufficiently far away from the minimum of one friction surface of the bridging clutch but also that the it moves away from the friction surface very quickly. This means that slippage losses in the area of the bridging clutch can be almost entirely eliminated.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
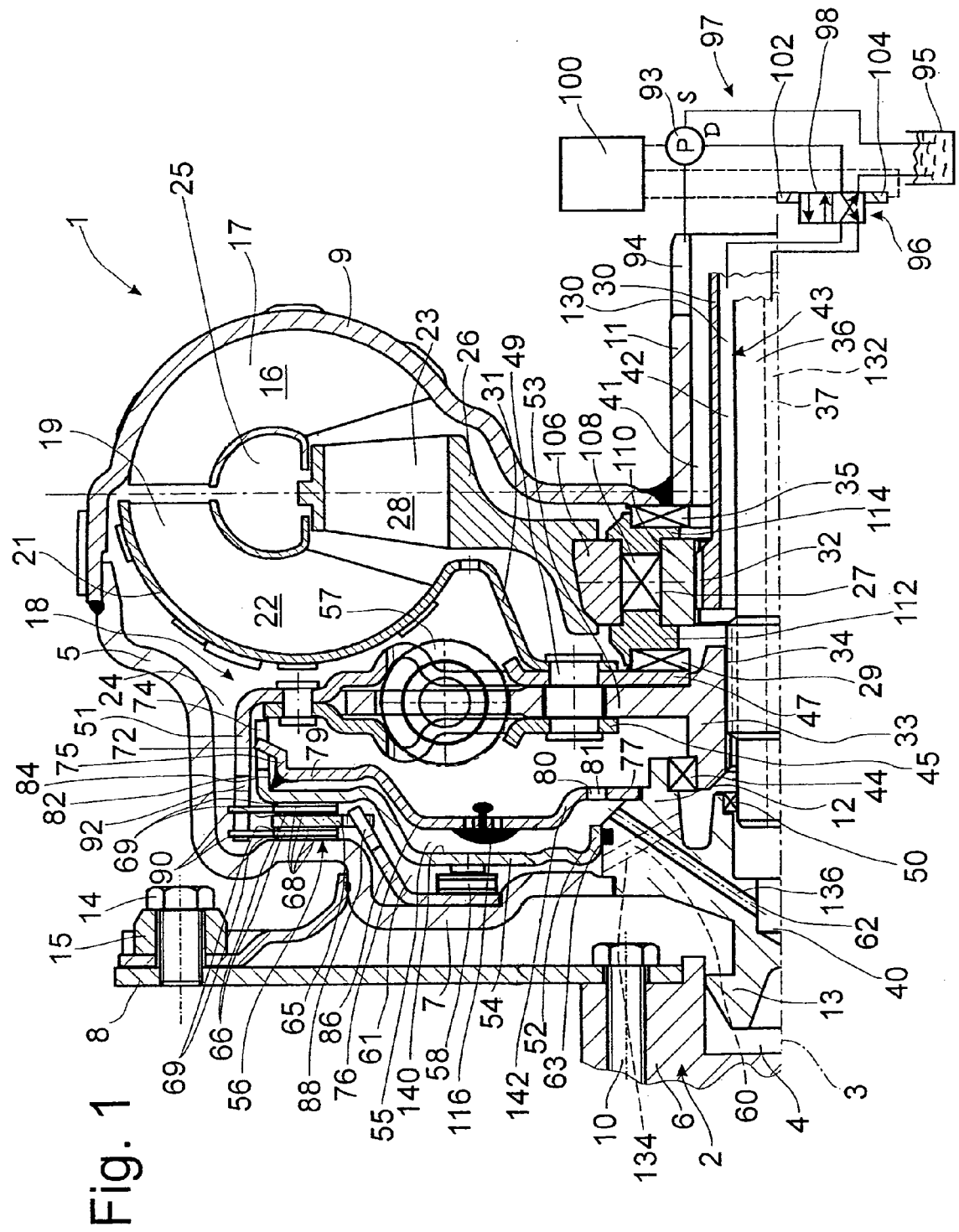
FIG. 1 shows the upper half of a longitudinal cross section through a hydrodynamic torque converter with bridging clutch based on the two-line concept.

FIG. 1 shows a hydrodynamic clutch device 1 in the form of a hydrodynamic torque converter, which is able to rotate around an axis of rotation 3. The hydrodynamic torque converter has a clutch housing 5. On the side of the housing facing a drive 2, such as an internal combustion engine with a crankshaft 6, the housing has a cover 7, which is permanently connected to a pump wheel shell 9. This merges with a pump wheel hub 11 in the radially inner area.

To return to the housing cover 7, this cover has, in the radially inner area, a bearing journal hub 12 carrying a bearing journal 13. The bearing journal 13 is mounted in a recess 4 in the crankshaft 6 to center the clutch housing 5 on the drive side. The housing cover 7 also has a fastening mount 15, which serves to attach the clutch housing 5 to the crankshaft 6 by way of a flexplate 8, namely, by means of fastening elements 14, preferably in the form of bolts screws. The flexplate 8 itself is attached by fastening elements 10, also preferably in the form of bolts screws, to the crankshaft 6.

The previously mentioned pump wheel shell 9 and the pump wheel vanes 16 together form a pump wheel 17, which works together with a turbine wheel 19, consisting of a turbine wheel shell 21 and turbine wheel vanes 22, and with a stator 23. The latter has stator vanes 28 on a stator hub 26 and together with the pump wheel 17 and the turbine wheel 19 forms a hydrodynamic circuit 24, which encloses an internal torus 25.

The stator 23 is mounted by its hub 26 on an outer body 106 of a freewheel 27. The outer body is mounted by way of a rolling element part 108 on an inner body 110. The outer body 106 centers the inner body 110 by means of a drive-side thrust washer 112 and a takeoff-side thrust washer 114, both of which are free of grooves, and it is also supported axially on the drive side against the journal hub 12 by way of the drive-side thrust washer 112, a drive-side axial bearing 29, a torsional vibration damper 18, and a bearing 44, whereas on the takeoff side, the outer body is supported against the pump wheel hub 11 by the takeoff-side thrust washer 114 and a takeoff-side axial bearing 35.

The stator 23 is mounted by way of the inner body 110 of its freewheel 27 on a support shaft 30 by means of a set of teeth 32 so that it can move axially but cannot rotate relative to the support shaft. The support shaft is installed radially inside the pump wheel hub 11 in such a way that an essentially annular, radially outer channel space 41 is formed. The support shaft 30, designed as a hollow shaft, for its own part surrounds a gearbox input shaft 36, acting as a power takeoff 43, leaving an essentially annular flow channel 42, which serves as a first flow route 130. The gearbox input shaft 36 has a central bore 37 for the passage of clutch fluid and therefore serves as the second flow route 132. The gearbox input shaft 36 has a set of teeth 34 by which it carries a torsion damper hub 33, sealed by a seal 50, in a nonrotatable but axially displaceable manner; this torsion damper hub 33 serves to center a takeoff-side cover plate 47. The cover plate 47 is permanently connected by through-rivets 49, which pass through the torsion damper hub 33 with clearance in the circumferential direction, to the turbine wheel base 31 of the turbine wheel 19 on one side and to a drive-side cover plate 45 on the other side. Together with the turbine wheel 19, the cover plates 45, 47 form the input part 51 of the torsional vibration damper 18, whereas the torsion damper hub 33 forms its output part 53. Damping elements 57 are provided around the circumference between the input part 51 and the output part 53, so that the input part 51 and the output part 53 can deflect with respect to each other around the axis of rotation 3, this relative delectability being limited by the through-rivets 49, which act as stops 64.

The previously mentioned flow channel 42 leads axially to a point adjacent to the seal 50 and from there to a first pressure medium line 60, which is formed by at least one channel 134 passing with a radial component through the journal hub 12. The first pressure medium line 60 opens out into a piston space 61, located axially between the housing cover 7 and a piston 54 of a bridging clutch 56. The side 140 of the piston 54 facing away from the piston space 61 forms a first wall of a pressure space 55, which is bounded on the opposite side by a second wall 142, which is referred to in the following as an anti-twist protection device 76 for the functional reasons explained below. This anti-twist device is attached to the journal hub 12 and has, on the radially inner end 77 of the part which extends in the radial direction, a throttle point 80 in the form of at least one through-opening 81, which connects the pressure space 55 to the hydrodynamic circuit 24. In the central area of its radial part, the anti-twist device 76 can be provided with a nonreturn valve 116, the design, action, and function of which will be discussed in detail elsewhere. At the radially outer end 79 of the part of the anti-twist device 76 extending in the radial direction, an axial shoulder 75 is formed, which carries a seal 82 on the end facing the piston 54. This seal rests with a sealing action against a collar 84, extending essentially in the axial direction, formed on the piston 54, whereas the free end of the axial shoulder 75 facing away from the piston 54 carries a set of teeth 72, by means of which it engages with essentially no play in the circumferential direction in an opposing set of teeth 74 formed on the free end of the collar 84 of the piston 54 but in such a way that the piston 54 is free to move in the axial direction.

To supply the pressure space 55 with clutch fluid, the central bore 37 of the gearbox input shaft 36 is connected to a transition space 40 formed in the journal hub 12. This transition space is connected to a second pressure medium line 62, which is in the form of at least one channel 134, passing with a radial component through the journal hub 12. The second pressure medium line 62 opens out into the pressure space 55. In correspondence with the pressure in the first pressure medium line 60 or in the second pressure medium line 62 and thus as a function of the pressure relationships in the hydrodynamic circuit 24 and in the pressure space 55, the piston 54 can be moved in the axial direction between two different limit positions, which will be discussed in greater detail below. By means of its base 52, the piston 54 is supported on the journal hub 12 so that it can slide back and forth axially, where a piston seal 63 let into the journal hub 12 seals the joint between the hub and the base 52 of the piston. In the radially central area of the piston 54, the piston can be received—under the axial loading of tangential leaf springs 58—by the inner plate carrier 86 of the bridging clutch 56, which carrier is attached by means of riveted joints (not shown) to the housing cover 7.

In the radially outer area of the piston 57, a radially inner plate 65, which is attached nonrotatably to the inner plate carrier 86 by means of a set of teeth 88, is located axially between the housing cover 7 and the piston 54. A radially outer plate 66 is provided on each side of the radially inner plate 65, and each radially outer plate is mounted nonrotatably by sets of teeth 90 on an outer plate carrier 92, which is designed as an integral part of the takeoff-side cover plate 47 of the torsional vibration damper arrangement 18. Each of the radially outer plates 66 has friction linings 68 on both sides. The two friction linings 68 which face the radially inner plate 65 cooperate with friction zones on the radially inner plate 65 to form a friction area 69, whereas one of the two friction linings 68 facing away from the radially inner plate 65 cooperates with a friction zone on the housing cover 7 to form a friction area 69. The other one of these two friction linings 68, furthermore, cooperates with a friction zone on the piston 54 to form a friction area 69.

The individual friction areas 69 are activated as soon as the friction linings 68 enter into working connection with their assigned friction zones, which is accomplished by the engagement of the piston 54 and thus of the bridging clutch 56. The engaging movement of the piston 54 stops when the piston 54 has traveled as far as it can within its range of axial movement and comes as close as possible to the housing cover 7. So that this engaging operation can occur, the pressure in the pressure space 55 must be built up to the point that it is greater than the pressure in the piston space 61. Because the piston space 61 is connected by the bridging clutch 56 to the hydrodynamic circuit 24, and because the bridging clutch 56, as can be seen on the basis of FIGS. 2 and 3, has grooves 70 in the area of the friction linings 68 of a size or in a number which allows a comparatively high flow rate of clutch fluid to pass, the piston space 61 is to be considered part of the hydrodynamic circuit 24.

Conversely, the individual friction areas 69 are deactivated as soon as the working connection of the friction linings 68 with their assigned friction zones is broken, which occurs when the piston 54 disengages and thus the bridging clutch 56 is released. The disengaging movement of the piston 54 stops when the piston 54 has traveled axially as far as possible within its range of axial movement away from the housing cover 7. So that the disengaging operation can occur, the pressure generated in the hydrodynamic circuit 24 and thus in the piston space 61 must be higher than that in the pressure space 55.

The piston 54 of the bridging clutch 56 is engaged and disengaged in the following way:

From the previously mentioned flow channel 42, located radially between the support shaft 30 and the gearbox input shaft 36, clutch fluid flows through the first pressure medium lines 60 to the hydrodynamic circuit 24 via the piston space 61 and the bridging clutch 56, whereas fluid flows through the central bore 37 in the gearbox input shaft 36 to supply the pressure space 55 via the transition space 40 and the second pressure medium lines 62. To guarantee that the amounts being supplied are always correct, a pressure circuit 97 shown in FIG. 1 is required. This circuit has a pressure source 93, which is driven in the conventional manner by a drive cam 94 on the pump wheel hub 11. The suction side S of the pressure source can be connected to a fluid reservoir 95, whereas its delivery side D can be connected either to the flow channel 42 between the support shaft 30 and the gearbox input shaft 36 or to the central bore 37 of the gearbox input shaft 36. The fluid is supplied to either the flow channel 42 or to the central bore 37 in correspondence with the commands given by a control unit 100, which is in working connection with a switching device 96 in the form of a switching valve 98 within the pressure circuit 97. The control unit is also connected to the pressure source 93, which is preferably a pump. The switching valve 98 is preferably designed as a 4/2-port directional control valve, actuated by electromagnets 102, 104, which deflect the switching device 96 in correspondence with the commands received from the control unit 100.

FIG. 1 shows the situation in which the piston 54 is in the engaged position. To disengage the piston 54, the switching device 96 is actuated by activation of the electromagnet 102 upon the command of the control unit 100 in such a way that the magnet pushes the switching valve 88 out of the position shown in FIG. 1 into a second position, in which the delivery side D of the pressure source 93 is connected to the flow channel 42 radially between the support shaft 30 and the gearbox input shaft 36. The pressure increases there as a result and simultaneously decreases in the central bore 37 of the gearbox input shaft 36, which is connected now via the switching valve 98 to the fluid reservoir 95.

The clutch fluid arriving through the flow channel 42 travels via the first pressure medium line 60 into the piston space 61, where it exerts pressure on the piston 54 in the direction toward the pressure space 55, which starts to empty through the second pressure medium line 62. Because of the positive pressure thus building up in the piston space 61 and thus also in the hydrodynamic circuit 24, which has essentially the same pressure as that of the piston space 61, i.e., positive in comparison with that in the pressure space 55, force is exerted on the drive side of the piston 54, as a result of which the piston 54 is shifted toward the torsional vibration damper 18. If the piston 54 is fastened to the housing cover 7 by way of axial spring-loading 58, and if this axial spring-loading 58 acts in a direction which assists the disengaging movement of the piston 54, the deflection of the piston 54 will be accelerated, and the drag torques at the friction areas 69 will be reduced to a minimum.

As clutch fluid continues to enter the piston space 61, the rapidly disengaging piston 54 allows the fluid to pass easily through the area of the bridging clutch 56, so that fresh clutch fluid enters the hydrodynamic circuit 24. Simultaneously, heated clutch fluid already present in the hydrodynamic circuit 24 can trickle away into the pressure space 55 through the throttle point 80, from which it is carried away via the second pressure medium line 62, the transition space 40, and the central bore 37 of the gearbox input shaft 36 to the fluid reservoir 95.

Figure 4:
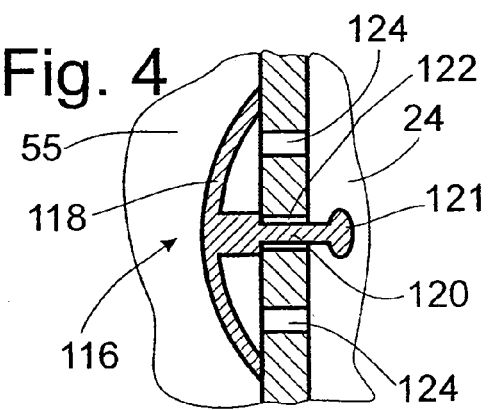
FIG. 4 shows an enlarged, detailed view of a nonreturn valve.

If it is desirable to exchange a large amount of clutch fluid in the hydrodynamic circuit 24 while the piston 54 is disengaged, it is possible to use a nonreturn valve 116 in the anti-twist device 76. This can be designed as shown in FIG. 4 in the form of a mushroom-shaped plastic part with a sealing cover 118 and an essentially cylindrical shaft 120 formed on the cover. The shaft 120 passes axially through a receiving opening 122 in the anti-twist device 76 and is held in this receiving opening 122 by a capture device 121 in such a way that the shaft can shift axially but cannot come lose from the anti-twist device 76. Immediately adjacent to the receiving opening 122 for the shaft 120, the anti-twist device 76 is penetrated by at least one through-opening 124, through which the sealing cover 118 can be actuated from the side of the hydrodynamic circuit 24 when there is positive pressure in the hydrodynamic circuit 24 versus the pressure space 55. As a result, via the through-opening 124, the sealing cover 118 is lifted away from the opposite side of the anti-twist device 76, so that an escape route, supplementing the throttle point 80, for clutch fluid through the through-opening 124 is released. Depending on the degree to which the sealing cover 118 is opened, which is a function of the pressure difference, and depending on the dimensions of its diameter and the number and/or size of the through-openings 124, an appropriate throughput of clutch fluid from the hydrodynamic circuit 24 into the pressure space 55 and from this space into the fluid reservoir 95 can be generated.

To engage the piston 54 again, the switching device 96 is now actuated by activation of the electromagnet 104 under the command of the control unit 100 in such a way that the magnet pushes the switching valve 88 out of its previous position back into the position shown in FIG. 1, in which the delivery side D of the pressure source 93 is connected to the central bore 37 in the gearbox input shaft 36. The pressure there increases as a result, whereas it drops simultaneously in the flow channel 42, which is provided radially between the support shaft 30 and the gearbox input shaft 36 and which is now connected via the switching valve 98 to the fluid reservoir 95.

Figure 2:
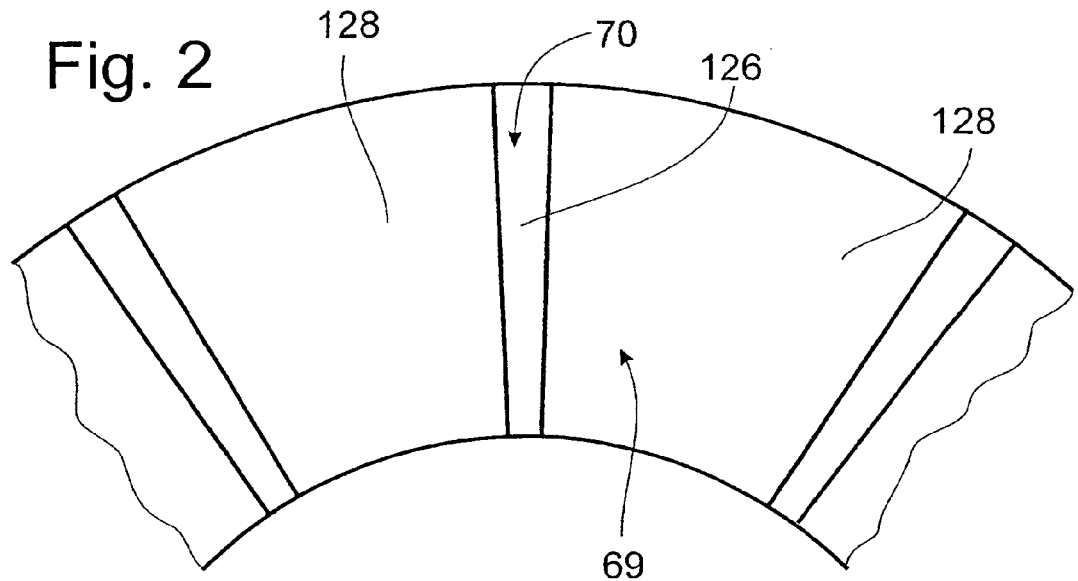
FIG. 2 is a plan view of the friction surface of the bridging clutch.
Figure 3:
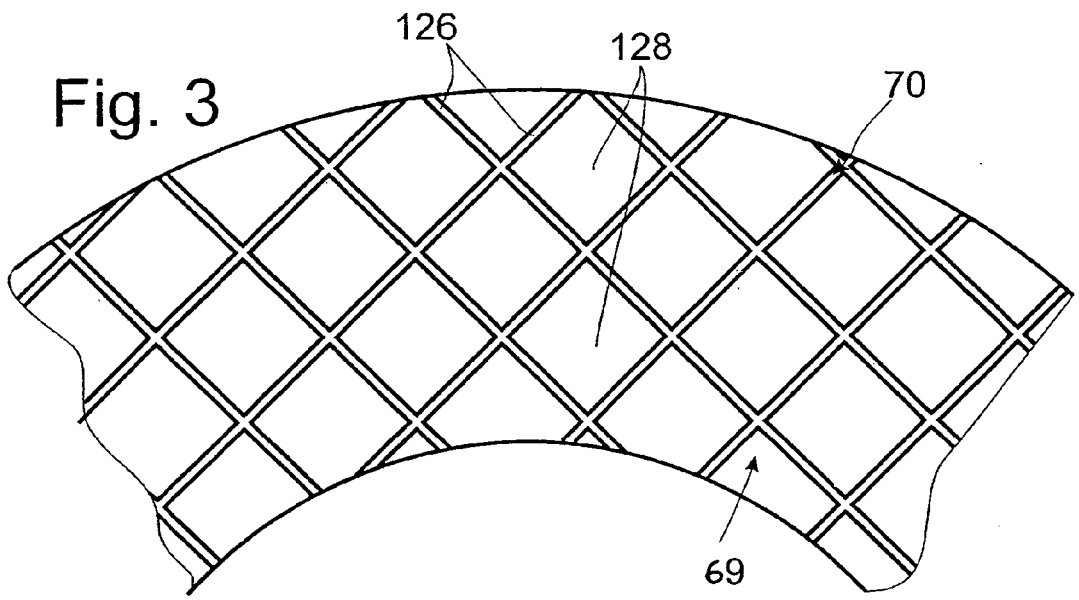
FIG. 3 is similar to FIG. 2 but shows a different design.

As a result of this pressure and connection situation, clutch fluid is conducted from the fluid reservoir 95 via the central bore 37 of the gearbox input shaft 36 and via the pressure medium line 62 into the pressure space 55. Assisted by the rotation of the clutch housing 5 around the axis of rotation 3, the clutch fluid flows radially outward, where the seal 82 prevents it from traveling any farther. When the pressure space 55 is filled in this way, any air which may have been present in it is displaced radially inward. When the pressure increases in the pressure space 55, the sealing cover 118 of the nonreturn valve 116 is pressed against the through-opening 124 and thus blocks the connection with the hydrodynamic circuit 24. The only way the air can escape is therefore through the throttle point 80 into the hydrodynamic circuit 24, but because the volume of the hydrodynamic circuit is larger than that of the pressure space 55, the air cannot cause any major disadvantages there. The pressure space 55, however, is filled quickly because of its small dimensions, nor does it contain a compressible air cushion, so that a positive pressure versus the hydrodynamic circuit 24 is built up very quickly. As a result, the opposing force of the axial spring-loading 58 can be easily overcome when the piston 54 is being engaged. Simultaneously, the hydrodynamic circuit 24 is emptied of fluid via the piston space 61 and the first pressure medium line 60, through which the fluid flows into the flow channel 42 and from there to the fluid reservoir 95. The progressive engaging movement of the piston 54 interferes to only an insignificant degree with this emptying function, and even after the piston 54 is fully engaged the emptying can continue, because, as shown in FIGS. 2 and 3, grooves 70 are provided between the pairs of friction lining segments 128 in the area of the friction surfaces 69; these grooves allow the clutch fluid to flow at a high volume flow rate through the bridging clutch 56 and thus ensure that the friction surfaces 69 are cooled efficiently. The grooves 70 are designed either according to FIG. 2 with wide groove channels 126 between the friction segments 128 of the friction surface 69 or according to FIG. 3 with a plurality of channels 126 between the respective friction segments 128.

A flow-intensive design of the friction surfaces 69 of this type in a hydrodynamic torque converter designed as a two-line system, in which a first line supplies clutch fluid to the hydrodynamic circuit 24 and a second line supplies clutch fluid to the pressure space 55, is possible only because, in contrast to the conventional design of such two-line systems, the only function of the bridging clutch 56 is to transmit torque in the engaged state of the piston 54 from the drive 2 to the takeoff 43. The hydrodynamic circuit 24 is thus bypassed, and does not fulfill the additional function of sealing off the hydrodynamic circuit 24 against the pressure space 55. The reason for this is that the bridging clutch 56 is located in the path along which the clutch fluid flows between the hydrodynamic circuit 24 and the piston space 61, which is to be considered a part of the hydrodynamic circuit. This means that the clutch fluid leaving via the bridging clutch 56 does not actually leave the hydrodynamic circuit 24. The hydrodynamic circuit 24 is isolated from the pressure space 55 by the anti-twist device 76, so that only the throttle point 80 exerts any influence on the volume flow rate at which the clutch fluid can flow between the hydrodynamic circuit 24 and the pressure space 55. If a faster exchange of clutch fluid is desired, the throttle point can be supplemented by the flow-through opening 124 of the nonreturn valve 116.

Because of the special way in which this hydrodynamic torque converter 1 operates, its hydrodynamic circuit 24 is not supplied with clutch fluid through a point somewhere along the axial dimension of the stator 23 in the manner of conventional two-line systems. That is, the fluid does not pass through grooves, for example, in the thrust washers 112, 114 of the freewheel 27 on which the stator 23 is mounted. Instead, the fluid passes through a point along the axial dimension of the bridging clutch 56, that is, concretely, via the first pressure medium line 60, the piston space 61, and finally the bridging clutch 56. For this reason, as already explained above, the thrust washers 112, 114 can be designed without the conventional flow grooves.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A hydrodynamic clutch device comprising:
   a clutch housing connected to a drive;
   a pump wheel connected to the clutch housing, the pump wheel having a hub;
   a turbine wheel connected to a takeoff, the turbine wheel and the pump wheel forming a hydrodynamic circuit;
   a bridging clutch essentially surrounded by the hydrodynamic circuit, the bridging clutch comprising a piston and at least one friction surface which can be acted on by the piston to connect the drive to the takeoff independently of the hydrodynamic circuit, the piston having one surface facing the at least one friction surface and an opposite surface;

a pressure space for exerting fluid pressure on the piston, the pressure space being bounded axially by first and second walls, the first wall being formed by the opposite surface of the piston, the first and second walls having a radially outer area;

a pressure circuit comprising a first pressure medium line to supply the hydrodynamic circuit with clutch fluid and a second pressure medium line to supply the pressure space with clutch fluid;

a seal which is effective in the radially outer area to at least substantially reduce exchange of fluid between the hydrodynamic circuit and the pressure space; and a throttle formed in the second wall, the throttle allowing a defined exchange of fluid between the hydrodynamic circuit and the pressure space.

2. The hydrodynamic clutch device of claim 1 wherein the throttle is dimensioned based on predetermined pressure and filling conditions in the hydrodynamic circuit.

3. The hydrodynamic clutch device of claim 1 further comprising:

a clutch fluid reservoir; and a pressure source connected to the reservoir;

wherein the first pressure medium line comprises a first flow route between the pump wheel hub and the takeoff and connects the fluid reservoir to the hydrodynamic circuit, and the second fluid pressure line comprises a second flow route in the takeoff and connects the fluid reservoir to the pressure space.

4. The hydrodynamic clutch device of claim 3 wherein the takeoff comprises a gearbox input shaft having a central bore, the central bore forming the second flow route, the clutch device further comprising a support shaft for a freewheel, the support shaft radially surrounding the gearbox input shaft and forming an annular flow channel, the annular flow channel forming the first flow route.

5. The hydrodynamic clutch device of claim 1 wherein the second wall connects the piston non-rotatably but with freedom of axial movement to the clutch housing.

6. The hydrodynamic clutch device of claim 1 wherein the piston comprises a collar which extends axially from the first wall toward the second wall, the seal being fixed to the second wall and engaging the collar.

7. The hydrodynamic clutch device of claim 1 wherein the second wall has a radially inner area in which the throttle is formed.

8. The hydrodynamic clutch device of claim 1 wherein the throttle is formed by a through opening in the second wall.

9. The hydrodynamic clutch device of claim 1 further comprising a spring which loads the piston axially with respect to the friction surface of the bridging clutch.

10. The hydrodynamic clutch device of claim 9 wherein the spring loads the piston axially away from the friction surface.

11. The hydrodynamic clutch device of claim 1 wherein the hydrodynamic circuit comprises a piston space axially opposite the pressure space, the first pressure medium line comprising a channel having a radial component connected to the piston space.

12. The hydrodynamic clutch device of claim 1 wherein the second pressure medium line comprises at least one channel having a radial component connected to the pressure space.

13. The hydrodynamic clutch device of claim 1 further comprising a stator mounted on a freewheel which is positioned axially between a pair of thrust washers, wherein the thrust washers are free of flow channels.

14. The hydrodynamic clutch device of claim 1 wherein the second wall separates the pressure space from the hydrodynamic circuit and has a check valve which stops flow when there is positive pressure in the pressure space and allows flow when there is positive pressure in the hydrodynamic circuit.

15. The hydrodynamic clutch device of claim 14 wherein the check valve comprises a stem and a cover, the stem being received through a receiving opening in the second wall, the cover covering at least one flow through opening in the second wall when the check valve is closed.

16. The hydrodynamic clutch device of claim 1 wherein the friction surface comprises at least one groove between at least two friction segments.

17. The hydrodynamic clutch device of claim 16 comprising a plurality of grooves between said friction segments.

* * * * *